United States Patent [19]

Westfall

[11] 3,844,469

[45] Oct. 29, 1974

[54] APPARATUS FOR OSCILLATING A WELDING TOOL

[76] Inventor: Clifford M. Westfall, 13 Brookfield, Conway, Ark. 72032

[22] Filed: Dec. 27, 1972

[21] Appl. No.: 318,870

[52] U.S. Cl. .................... 228/28, 219/125, 228/32
[51] Int. Cl. ............................................ B23k 5/00
[58] Field of Search ............ 228/28, 29, 32; 266/23; 219/124, 125; 74/25

[56] References Cited
UNITED STATES PATENTS

| | | | |
|---|---|---|---|
| 1,477,538 | 12/1923 | Carter et al. | 228/28 X |
| 2,472,948 | 6/1949 | Hoff, Jr. | 228/32 X |
| 3,619,552 | 11/1971 | Cape | 228/28 X |
| 3,681,564 | 8/1972 | Hiyama et al. | 219/125 R |
| 3,748,433 | 7/1973 | Gwin et al. | 219/125 R |

Primary Examiner—J. Spencer Overholser
Assistant Examiner—Robert J. Craig
Attorney, Agent, or Firm—Wegner, Stellman, McCord, Wiles & Wood

[57] ABSTRACT

Apparatus for oscillating a welding tool. A welding tool is mounted for slidable movement and a fluid-actuated cylinder is employed to reciprocate the welding tool. A control circuit including a pair of valves is employed to control the length of stroke of the fluid cylinder. Accumulators are also employed in the fluid control circuit so that dwell of the tool at each end of its stroke may be adjusted. A separate fluid circuit including an adjustable restriction has a cylinder operated by the aforementioned fluid cylinder and the restriction may be varied to vary the speed of the tool through its stroke.

10 Claims, 5 Drawing Figures

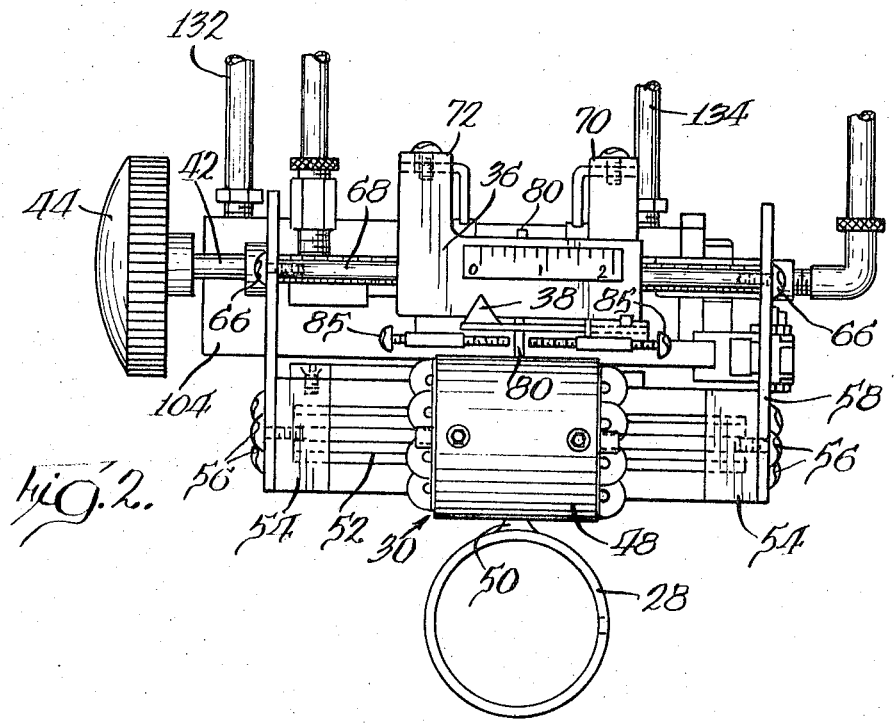
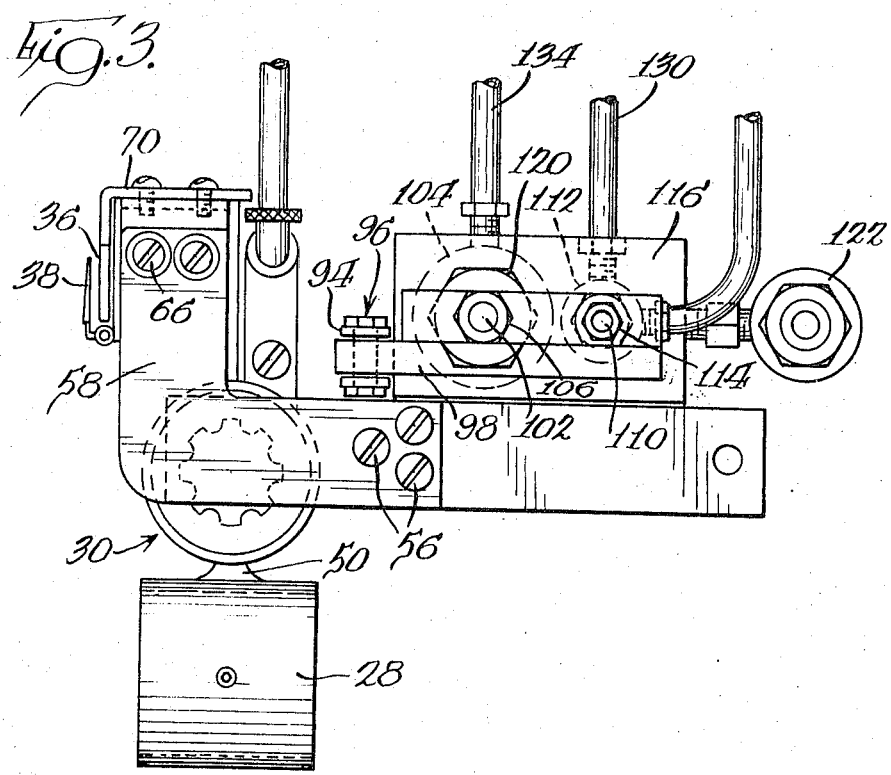

APPARATUS FOR OSCILLATING A WELDING TOOL

BACKGROUND OF THE INVENTION

This invention relates to apparatus for oscillating tools, and more particularly, welding tools such as an arc welder.

A variety of assembly operations require that parts be welded together in a rather precise fashion. Such assembly operations are frequently quite expensive in terms of labor costs and reliability problems. Accordingly, there is a need for apparatus providing an increased degree of automation for such welding operations and which can eliminate or substantially minimize the effects of human error in posing subsequent reliability problems.

SUMMARY OF THE INVENTION

It is the principal object of the invention to provide a new and improved oscillator for a welding tool.

More specifically, it is an object of the invention to provide such an apparatus wherein the width of stroke of the tool may be selectively varied, the speed or rate of stroke may be selectively varied, and the dwell of the tool at either end of the stroke, if any, can be selectively varied whereby the apparatus can be adjusted to accommodate a large variety of welding operations and perform each in a highly automated fashion with reproducibility of results and a high degree of reliability.

An exemplary embodiment of a welding oscillator made according to the invention is fluid powered and includes a welding tool or head holder mounted for reciprocation on a ball spline by means of a ball nut. A double-acting fluid cylinder is employed to reciprocate the nut, and thus a tool, on the ball spline. The ball nut carries a control actuator which is flanked by a pair of fluid-operated pilot valves. The pilot valves are mounted on opposite ends of a reversely threaded member which may be rotated in one direction to bring the two valves closer together and closer to the actuator or in the opposite direction to move the valves further apart and further from the actuator. Through a fluid circuit, the pilot valves are employed to selectively adjust the width of stroke of the apparatus.

The power cylinder for reciprocating the ball nut is mechanically linked to a liquid-containing cylinder having its opposite ends connected together by a suitable conduit including an adjustable restriction such as a needle valve. By appropriately adjusting the needle valve, resistance to fluid flow in the path may be increased or decreased to thereby control the speed or rate of the reciprocal stroke.

The invention also includes a main, pilot-operated valve linked with the aforementioned pilot valves for controlling the application of fluid under pressure to the double-acting power cylinder. Accumulators with adjustable bleeds to vent are included in the control circuit for the purpose of controlling change in condition of the main valve in response to the application of fluid under pressure thereto by the pilot valves. By suitably adjusting the bleeds associated with the accumulators, the dwell at each end of the stroke of the tool may be suitably regulated.

Other objects and advantages of the invention will become apparent from the following specification taken in conjunction with the accompanying drawings.

DESCRIPTION OF THE DRAWINGS

FIG. 2 is a front elevation of the welding oscillator;

FIG. 3 is a side elevation of the welding oscillator;

DESCRIPTION OF THE PREFERRED EMBODIMENT

Figure 1:
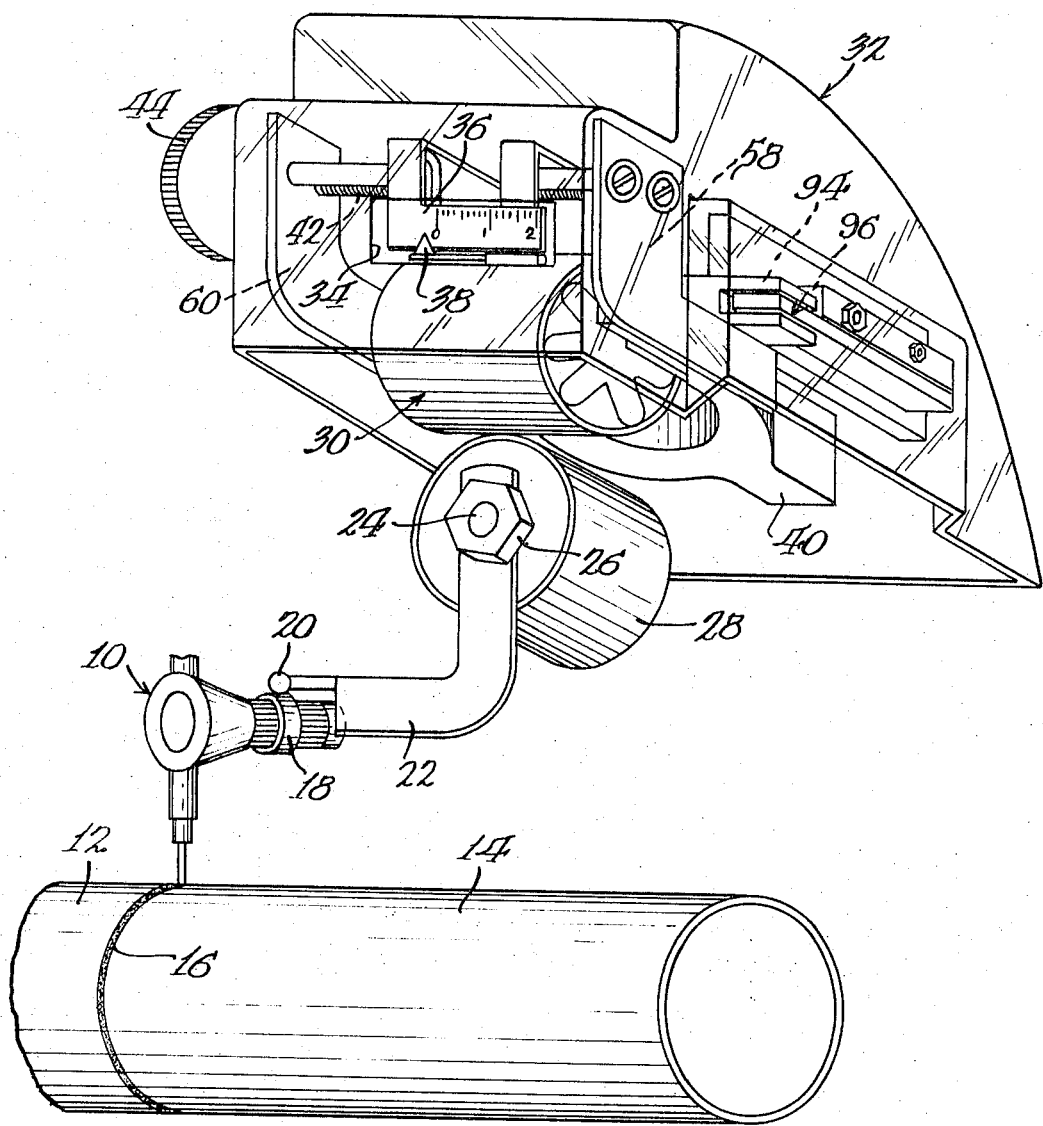
FIG. 1 is a perspective view of a welding oscillator made according to the invention and illustrating the same as mounting a welding tool which, in turn, is being applied to work in the form of a section of pipe.

An exemplary embodiment of a welding oscillator made according to the invention is illustrated in the drawings and with specific reference to FIG. 1, is seen to be mounting a welding tool, generally designated 10, such as an arc welding head for application to two sections of pipe 12 and 14 to form a linking weld 16 as the pipe sections 12 and 14 are slowly rotated simultaneously about their longitudinal axis by any suitable means. In general, by means to be described in greater detail hereinafter, the welding oscillator moves the welding head 10 in a reciprocal path generally parallel to the longitudinal axes of the pipe sections 12 and 14 a predetermined distance at a predetermined speed with a predetermined dwell at the end of each stroke in either direction.

The welding head 10 is supported by a collar 18 secured by a fastener 20 to a mounting arm 22. Preferably, the fastener 20 is such that it may be easily loosened to release the welding head 10 and, if desired, may allow the welding head 10 to be fixed at any desired angular orientation with respect to the arm 22.

As illustrated, the arm 22 is L-shaped and its upper end is freely received on a threaded shaft 24 which, in turn, impales a nut 26. The shaft 24 is mounted within a sleeve 28 in any suitable fashion. For example, the same could be associated with an expansion plug so that tightening the nut 26 on the shaft 24 will firmly fix the assemblage in place within the sleeve 28 through frictional locking. Alternatively, the threaded shaft 24 may be suitably fixed within the sleeve 28 in a permanent fashion. By this means, the angular relation of the arms 22 relative to the sleeve 28 may be selectively adjusted.

The foregoing elements constitute a welding tool holding means and the same is mounted for reciprocal movement by means, generally designated 30, which define a path of movement that is generally parallel to the longitudinal axis of the pipe sections 12 and 14. Of course, for use in other types of welding operations, this relationship need not be the case. Normally it will be preferred that the path of movement provided by the mounting means 30 be such that the welding tool 10 is reciprocated transversely across the interface of two components to be welded together.

The mounting means 30 are located within a housing 32 which may be made of formed plastic or the like. As illustrated, the same is transparent so as to provide an indication of the location of various parts therewithin. However, this is by no means a necessary feature of the invention.

The housing 32, at its front end, may include a window 34 through which a scale 36 and associated pointer 38 are visible. As will be seen, the location of the pointer 38 on the scale 36 is indicative of the length of stroke to be provided and adjusting means for stroke length regulation will be described in greater detail hereinafter.

The housing 32 may also mount, at suitable locations, other adjustable controls (not shown in FIG. 1) and suitable scales.

Within the housing 32 there may be located a main supporting yoke 40, which supports the various components in a manner to be described in greater detail hereinafter. The housing may also contain an adjusting screw 42 having an end extending externally of the housing 32 to receive a knob 44 whereby the length of stroke may be controlled. Various control components are located in the housing as well as a linkage, generally designated 46, which, as will be seen, interconnects a power operator and a mounting means 30 for ultimately causing reciprocation of the welding head 10.

Figure 4:
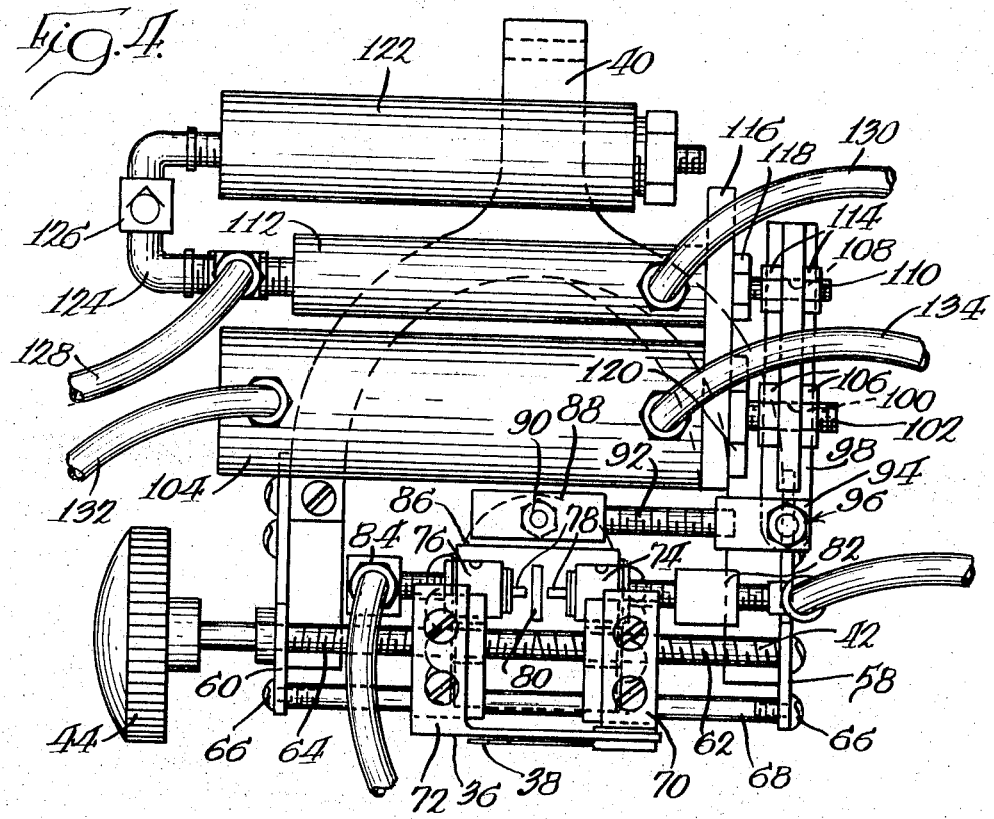
FIG. 4 is a plan view of the welding oscillator.

Turning now to FIGS. 2-4, inclusive, in which the oscillator is illustrated with the housing 32 removed, the sleeve 28 is seen to be connected to a conventional ball nut 48 forming part of the reciprocal mounting means 30 by means of an ordinary weld 50. The ball nut 48 is received on a conventional ball spline 52 which is received between the ends 54 of the arms of the yoke 40 and secured in place by any suitable means.

The use of the ball spline 52 and the ball nut 48 as the reciprocal mounting means is of substantial significance in that a relatively frictionless slide bore reciprocal mount for the tool head and one with very little play is provided so that the tool head will undergo uniform movement in a relatively precise path.

Screws 56 serve to secure upstanding plates 58 and 60 to the exterior sides of the arm ends 54. The plates 58 and 60, as best seen in FIG. 3, have upturned ends. Extending between the upturned ends and journaled in the plates 58 and 60, as best seen in FIG. 4, is the adjusting screw 42. As illustrated, on the right-hand end thereof, there is a right-hand thread 62 while the left-hand end bears a left-hand thread 64.

Also extending between the plates 58 and 60 and secured thereto by means of screws 56 is a guide rod 68.

A pair of pilot valve mounting plates 70 and 72 are threaded on the reversely threaded member 42. The specific arrangement is such that the mounting plate 70 is threaded on the right-hand thread 62 while the mounting plate 72 is threaded on the left-hand thread 64. As a result, it will be appreciated that when the knob 44 is rotated in a clockwise direction, the plates 70 and 72 will separate, while for the opposite direction of rotation, they will be moved towards each other, sliding along the guide rods 68.

As best illustrated in FIGS. 1 2 and 4, the plate 72 mounts the scale 36 while the plate 70 has the pointer 38 connected thereto. In addition, as best seen in FIG. 4, plate 70 mounts a pilot valve 74, while the plate 72 mounts a pilot valve 76. The actuators 78 of the pilot valves 74 and 76 are directed towards each other and are separated by an upstanding operator 80. The operator 80 is movable with the ball nut 48 and is adapted to engage either one of the actuators 78 of the pilot valves 74 and 76 for the purpose of tripping a control system causing reversal of the direction of movement of the ball nut 48. Thus, by suitably rotating the knob 44, the distance between the valves 74 and 76 may be changed to adjust the length of stroke of the tool 10. Suitable fittings 82 and 84 respectively connect pilot valves 74 and 76 into a fluid operated control system to be described in greater detail hereinafter.

Each of the plates 70 and 72 further mounts a respective stop screw 85. The stop screws 85 are directed toward each other and the operator 80 is located between the two. Prior to initial operation of the device, the stop screws 85 are adjusted such that the operator 80 will engage the actuators 78 of the pilot valves to trip the same while preventing the operator 80 from engaging the actuators 78 with sufficient force to damage the associated valve. Upon engagement of the operator 80 with a stop screw 85, further movement of the ball nut 48 will be stalled until such time as the moving force applied to it is reversed in direction as will be seen.

The upstanding operator 80 is secured by any suitable means to a generally horizontally extending plate 86 which is secured to the ball nut 48 for movement therewith. The plate 86 in turn is secured to a yoke-like element 88 by a fastener 90. The yoke-like element 88, in turn, is connected by a threaded shaft 92 to a further yoke-like connector 94. A nut and bolt, generally designated 96, in turn connect the yoke-like connector 94 to an arm 98 forming part of the linkage 46. The arm 98 includes an aperture 100 intermediate its ends for receiving threaded end 102 of the piston rod of a double-acting main air power cylinder 104. The piston rod is secured in the aforementioned position by means of nuts 106.

The end of the arm 98 opposite its point of connection to the yoke-like connector 94 includes a further aperture 108 receiving the threaded end 110 of a piston rod of an oil cylinder 112. Again, the piston rod end 110 is held in the aforementioned location by a nut 114.

The cylinders 104 and 112 are, in turn, secured to the assemblage by an upstanding plate 116 to which they are connected by nuts 118 and 120 and which is secured in any suitable fashion to the main yoke 40. In addition, an oil reservoir housing 122 is provided and is connected by a conduit 124, including a check valve 126, to one end of the oil cylinder 112. The same end of the oil cylinder 112 includes a connection to a conduit 128 forming part of a control system for the apparatus, while the opposite end of the oil cylinder 112 is in fluid communication with a similar conduit 130.

By the same token, the air cylinder 104 is provided with outlet conduits 132 and 134.

Figure 5:
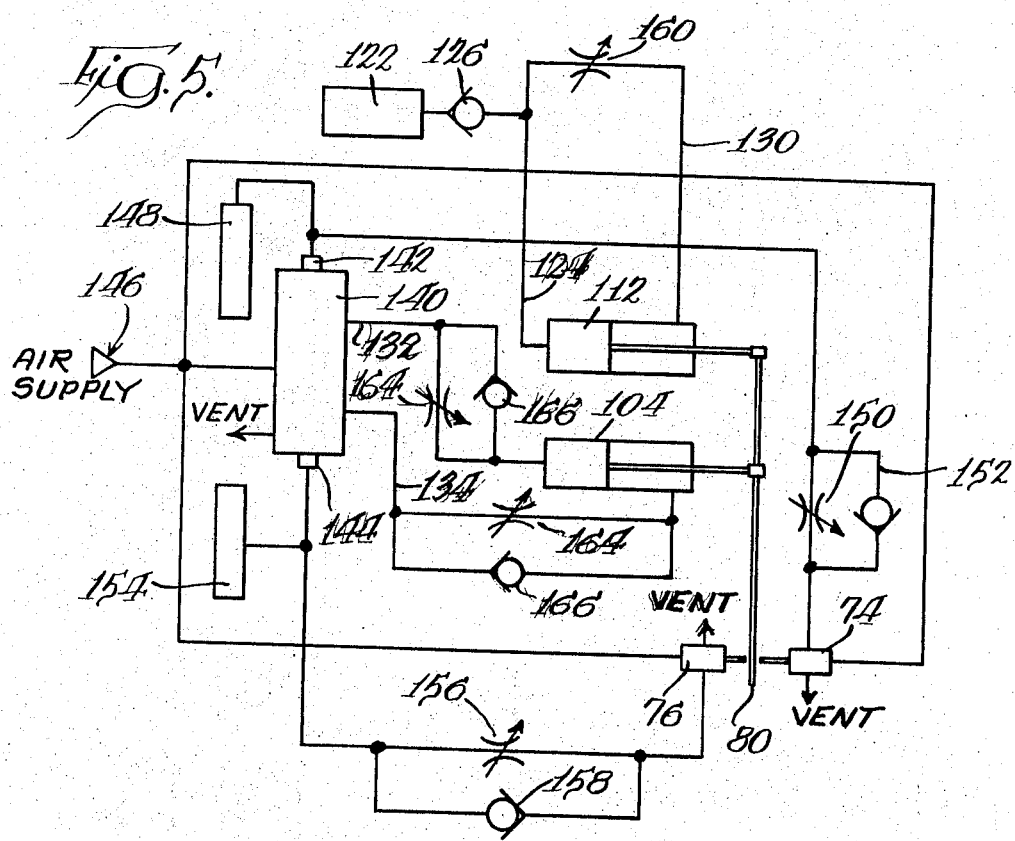
FIG. 5 is a schematic of a fluid control circuit for the welding oscillator.

Turning now to FIG. 5, a complete control system for the apparatus will be described. The main air cylinder 104, which is operative to shift the ball nut 48 on the ball spline 52, has its fluid ports connected to an air-operated pilot-operated four-way valve 140. The valve 140 is provided with a first pilot 142 and a second pilot 144. The valve 140 is also connected by a suitable conduit to a source of air under pressure, generally designated 146, and also has a port connected to vent as illustrated.

The pilot 142 is in fluid communication with an accumulator 148 and is connected through the parallel combination of an adjustable restriction 150, such as a needle valve, and a check valve 152 to the pilot valve 74.

The pilot 144 of the valve 140 is connected to an accumulator 154 and the parallel combination of an adjustable restriction 156 and a check valve 158 to the pilot valve 76.

Each of the pilot valves 74 and 76 are connected by respective conduits to the air source 146 as illustrated.

The system is completed by an interconnection between the lines 124 and 130 running from the oil cylinder 112 to each other via an adjustable restriction 160 which, again, may be a needle valve.

As generally alluded to previously, length of stroke, speed of stroke and dwell at end of stroke, can all be regulated with the invention. Length of stroke is regulated by appropriate manipulation of the knob 44 to move the pilot valves 74 and 76 towards or away from each other.

Rate or speed of stroke is adjusted by adjusting the needle valve 160. When a greater speed of stroke is desired, the effective restriction provided thereby is decreased, while when a slower stroke is required, the degree of restriction is increased.

Dwell at end of stroke is accomplished by adjusting either one of the needle valves 150 and 156. Specifically, dwell at the left-hand end of the stroke is regulated by adjusting the valve 150, while dwell at the right-hand end of the stroke is regulated by adjusting the valve 156. In each case, by adjusting the valves 150 to provide a greater effective restriction to fluid flow, dwell is increased.

With the foregoing in mind, the operation of the apparatus will now be described. Assuming that the condition of the main valve 140 is such that air under pressure will be directed through the line 132 to the air cylinder 104, the piston thereof will begin to move toward the right and through the above-described linkage will carry the ball nut on the ball spline to the right thereby moving the tool 10 to the right. At some point in such movement, the operator 80 will contact the actuator 78 of the pilot valve 74. This will result in air from the supply 146 being directed through the valve 74, and the check valve 152 to the accumulator 148 and the pilot 142 of the main valve 140. This will cause the valve 140 to shift to vent the line 132, while applying air under pressure to the line 134. As a result, the piston of the cylinder 1104 will move to the left carrying the operator 80 with him until such time as the actuator 78 for the valve 76 is contacted. At this point in time, air from the supply will be directed through the check valve 158 to the pilot 144 and the accumulator 154. Thus, it will be seen that the physical separation of the valves 74 and 76, as regulated by the width control knob 44, controls the length of stroke of the apparatus.

With regard to the control of dwell at the end of the stroke, when air is, for example, applied under pressure by the valve 76 to the pilot 144, the valve 140 will not necessarily immediately change condition to reverse the connections of the lines 132 and 134 to vent and air the reverse direction of piston movement of the cylinder 104. Rather, the change in condition will depend on the air pressure being applied to the pilot 142 at this time. It will be recalled that when the piston of the cylinder 104 moves to the right and trips the pilot valve 74, air under pressure was applied to the accumulator 148 and if a substantial amount of such pressure has been retained therein, the valve 140 will not change condition until some of that pressure has been relieved.

The time required for such relief is regulated by the needle valve 150. In other words, the needle valve acts as a bleed for the accumulator 148 to vent through the valve 74 whenever its actuator is not contacted by the operator 80.

Thus, in the aforementioned situation, once the leftmost extent of the stroke has been reached, further movement will be stalled by the physical blocking action of one of the stop screws 85 against the operator 80 until such time as a sufficient amount of pressure has been bled off through the needle valve 150 from the reservoir 158 to allow shifting of the spool of the four-way valve 140.

Identical regulatory action of dwell is accomplished at the opposite end of the stroke by reason of the provision of the accumulator 154 and the needle valve 156.

As is apparent from the foregoing description, movement of the piston of the power air-operated cylinder 104 also causes similar movement of the piston of the oil cylinder 112. In other words, the piston of the cylinder 104 cannot move without movement of the piston of the cylinder 112. The rate of movement of the latter is controlled by the rate of fluid flow from one end of the cylinder to the other through the conduits 124 and 130, which, in turn, is controlled by the effective restriction offered by the needle valve 160.

Thus, it will be appreciated that an oscillator made according to the invention provides great operation flexibility in terms of providing a variety of adjustments to suit the system for a given welding operation and repetitively performs the function of oscillating the welding tool so long as air under pressure is provided at the source 146. It will also be appreciated that the apparatus is such that different dwells at each end of the stroke may be provided. Should, for any reason, it be desired to provide for different speeds or stroke rates in different directions, the same could be accomplished by connecting the conduit 124 through a needle valve to a reservoir while connecting the line 130 through a second needle valve to a similar reservoir. By suitably adjusting both such needle valves, different rates of speed could be obtained, if desired.

As an alternate speed control system for the oil cylinder 112, the parallel combination of a needle valve 164 and a check valve 166 may be located in each of the lines 132 and 134. The needle valves 164 function in the same general manner as the needle valves 150 and 156 to control the rate of bleed to vent from the cylinder 104. Thus, backpressure in the cylinder 104 is controlled to control rate of stroke. This arrangement has the advantage of providing different speeds of stroke in opposite directions if desired.

I claim:

1. An oscillator for a welding tool comprising: means for holding a welding tool for application to work; means mounting said holding means for reciprocal movement; means for reciprocating said holding means on said mounting means; and control means for said reciprocating means including means for adjusting the length of each reciprocal stroke; means for adjusting the speed of reciprocation; and means for providing a predetermined, adjustable dwell of said holding means at each end of a stroke; said means for reciprocating said holding means including a fluid operated cylinder having a piston operatively connected to said mounting means; and said stroke length adjusting means including a pair of control valves for said cylinder, said control valves being movable toward and away from each other and engageable by one of said cylinder piston, said mounting means and said holding means.

2. A welding oscillator according to claim 1 wherein said control valves are received on respective ends of a reversely threaded member, and means for rotating said reversely threaded member whereby rotation in one direction will cause said valves to move away from each other while rotation of said threaded member in the opposite direction will cause said valves to move towards each other.

3. An oscillator for a welding tool comprising: means for holding a welding tool for application to work; means mounting said holding means for reciprocal movement; means for reciprocating said holding means on said mounting means; and control means for said reciprocating means including means for adjusting the length of each reciprocal stroke; means for adjusting the speed of reciprocation; and means for providing a predetermined, adjustable dwell of said holding means at each end of a stroke; said speed adjusting means including a cylinder having a piston mechanically linked to one of said holding means, said mounting means and said reciprocating means and further including at least one adjustable fluid flow restriction device in fluid communication with said cylinder.

4. The welding oscillator of claim 3 wherein said last-named cylinder is filled with a liquid and wherein said adjustable fluid flow restricting device comprises a valve in a fluid line interconnecting opposite ends of said cylinder.

5. An oscillator for a welding tool comprising: means for holding a welding tool for application to work; means mounting said holding means for reciprocal movement; means for reciprocating said holding means on said mounting means; and control means for said reciprocating means including means for adjusting the length of each reciprocal stroke; means for adjusting the speed of reciprocation; and means for providing a predetermined, adjustable dwell of said holding means at each end of a stroke; said reciprocating means comprising a fluid actuated, double acting cylinder and a fluid pilot operated valve operative to alternately apply fluid under pressure to opposite ends of said cylinder; and said dwell selecting means including fluid reservoirs associated with the pilots of said valve and adjustable fluid bleed means in fluid communication with said reservoirs.

6. An oscillator for a welding tool comprising: means for holding a welding tool for application to work; means mounting said holding means for back and forth movement in a predetermined path; reversible motor means for reciprocating said holding means on said mounting means along said predetermined path; means for alternately reversing said motor means; control means for said reversing means comprising a pair of control elements, and an actuator mounted for movement with said holding means for alternately engaging said control elements, one of said control elements causing operation of said motor means in one direction and actuation of the other of said control means causing operation of said motor means in the opposite direction; and means mounting at least one of said control elements for relative movement to the other and to said actuator.

7. The welding oscillator of claim 6 further including a pair of adjustable time delay means, each operatively interposed between a respective one of said control elements and said reversing means whereby the dwell of said holding means at each end of said path may be selectively adjusted.

8. The welding oscillator of claim 7 wherein said control elements comprising pilot valves, said motor means comprises a fluid-actuated cylinder; said reversing means comprises a fluid pilot-operated valve for alternately applying fluid under pressure to opposite sides of said cylinder; and said time delay means each include a fluid accumulator and an adjustable bleed circuit therefor.

9. A welding oscillator according to claim 6 further including speed control means operatively associated with said motor means.

10. A welding oscillator according to claim 9 wherein said speed control means comprises an adjustable, mechanical resistance mechanically linked to said motor means.

* * * * *